(No Model.)

J. W. & A. MATHIS.
PNEUMATIC DESPATCH APPARATUS.

No. 594,090. Patented Nov. 23, 1897.

Attest:
James Cavallin
M. H. Holmes

Inventors:
J. W. and A. Mathis.
by Robert Burns Att'y.

UNITED STATES PATENT OFFICE.

JULIEN W. MATHIS AND AUGUST MATHIS, OF CHICAGO, ILLINOIS.

PNEUMATIC-DESPATCH APPARATUS.

SPECIFICATION forming part of Letters Patent No. 594,090, dated November 23, 1897.

Application filed June 1, 1897. Serial No. 639,053. (No model.)

*To all whom it may concern:*

Be it known that we, JULIEN W. MATHIS and AUGUST MATHIS, citizens of the United States, residing at Chicago, in the county of Cook and State of Illinois, have invented a certain new and useful Improvement in Pneumatic-Despatch Apparatus; and we do hereby declare the following to be a full, clear, and exact description of the same, reference being had to the accompanying drawings, forming a part of this specification.

The present invention relates to means for discharging a carrier from the carrier tube or duct of a pneumatic-despatch apparatus, and more especially to that type in which a flap on the side of the tube or duct opens to permit the discharge of the carrier, the object of the present improvement being to provide a simple, durable, and sensitive arrangement of the hinged flap or shutter of a pneumatic-despatch apparatus and with which the flap or shutter is normally held at a partially open position, but adapted to closure by a suction of air within the duct or tube and at the same time adapted to receive the least impact from the carrier as it is discharged from the duct, all as will hereinafter more fully appear, and be more particularly pointed out in the claims.

We attain such object by the construction and arrangement of parts illustrated in the accompanying drawings, in which—

Figure 1:
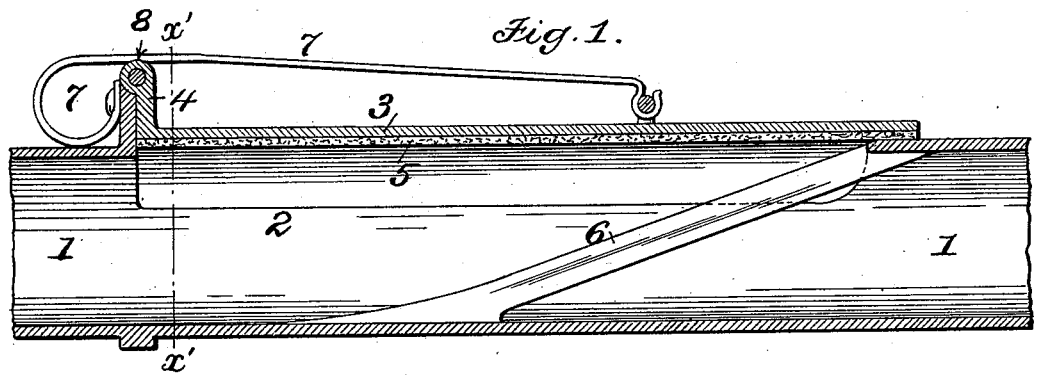
Figure 2:
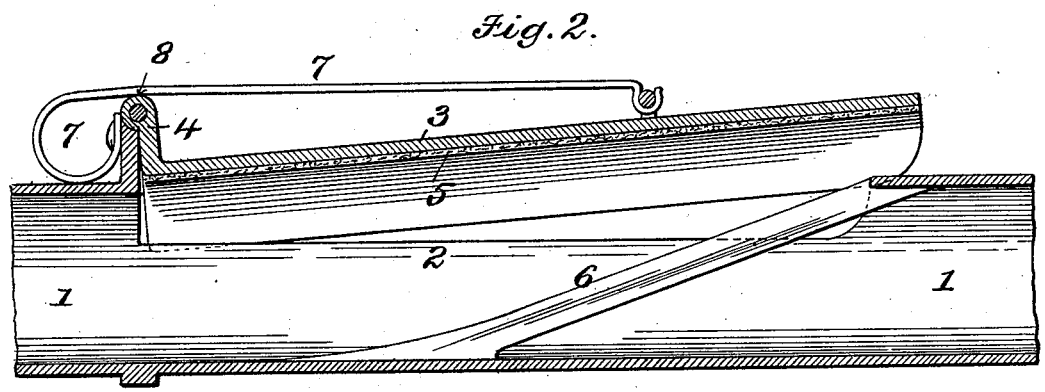
Figure 3:
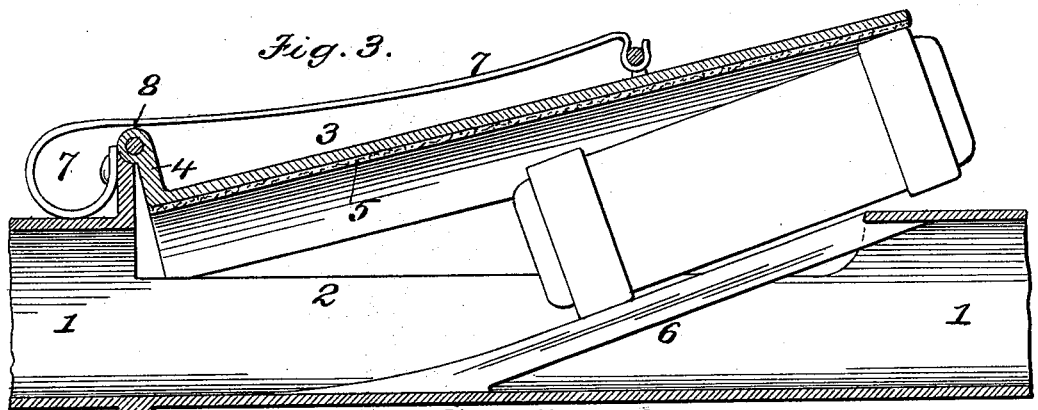
Figure 4:
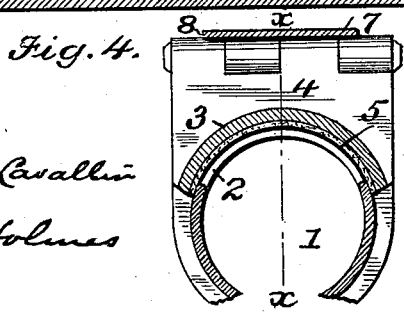

Figure 1 is a longitudinal sectional elevation at line *x x*, Fig. 4, of a portion of a pneumatic-despatch tube or duct provided with our present invention, the flap or shutter being shown in a closed condition; Fig. 2, a similar view with the flap or shutter in its normal position and partly open; Fig. 3, a similar view with the flap or shutter fully open to permit of the discharge of the carrier; Fig. 4, a transverse section at line *x' x'*, Fig. 1.

Similar numerals of reference indicate like parts in the several views.

The present improvement is intended for use in that type of pneumatic-despatch apparatus, in which two or more stations are connected together by independent sending and return tubes, and more especially to that class of such apparatus in which is a suction as distinguished from a pressure of air in the motive force that impels the carriers through the despatch-tube.

Referring to the drawings, 1 represents a straight portion of a pneumatic-despatch tube or duct having a discharge-opening 2 in its side that is covered by a flap or shutter 3, hinged to the tube 1 by a hinge 4, as shown. This shutter 3 will usually be provided with a facing 5 of felt to deaden the noise consequent to the operation of the apparatus.

6 is an obliquely-arranged deflector that extends from the far end of the opening 2 to the opposite wall of the duct or tube 1, and which is adapted to deflect the carrier outward through the opening 2 into any suitable receptacle arranged in line therewith.

In the present invention, 7 is a spring of any usual form, one end of which is attached to the hinged shutter 3 and the other end to the tube or duct 1, the tendency of which is to maintain the hinged shutter 3 normally in a partially-opened condition, as represented in Fig. 2, when the suction or exhaust force employed in the system is absent from the interior of the despatch-tube 1, a further closing of such shutter by the presence of such suction or exhaust in the interior of said tube being effected against the tension of the spring in one direction, while a further opening of said shutter is effected against the tension of said spring in an opposite direction. This result is obtained by the introduction of an intermediate rest or abutment 8 between the points of attachment of the spring 7 to the tube and shutter. In our preferred construction, as shown in the drawings, such rest or abutment is formed by the outer end of the hinge 4, which projects away from the despatch-tube 1 and shutter 3 for this purpose, as shown. Other equivalent arrangements of the abutment may be employed without departing from the spirit of the present invention.

Having thus fully described our said invention, what we claim as new, and desire to secure by Letters Patent, is—

1. The combination of a pneumatic-despatch tube, having a side opening, a hinged shutter closing the same, and spring tending to hold said shutter in a partially open condition, substantially as set forth.

2. The combination of a pneumatic-despatch tube, having a side opening, a hinged shutter closing the same, a spring tending to hold said shutter in a partially open condition, and an intermediate abutment or rest for such spring between the point of attachment of said spring to the despatch-tube and to the hinged shutter, substantially as set forth.

3. The combination of a pneumatic-despatch tube, having a side opening, a hinged shutter closing the same, a spring tending to hold said shutter in a partially open condition, and a hinge 4, forming an intermediate rest or abutment for the spring between the point of attachment of said spring to the despatch-tube and to the hinged shutter, substantially as set forth.

In testimony whereof witness our hands this 25th day of May, 1897.

JULIEN W. MATHIS.
    AUGUST MATHIS.

In presence of—
 ROBERT BURNS,
 JAMES LAVALLIN.